(12) United States Patent
Kamrath

(10) Patent No.: US 11,712,141 B2
(45) Date of Patent: Aug. 1, 2023

(54) CONNECTOR ASSEMBLIES AND ASSOCIATED METHODS

(71) Applicant: Rexair LLC, Troy, MI (US)

(72) Inventor: Robert R. Kamrath, Grand Rapids, MI (US)

(73) Assignee: REXAIR, LLC, Troy, MI (US)

( * ) Notice: Subject to any disclaimer, the term of this patent is extended or adjusted under 35 U.S.C. 154(b) by 0 days.

(21) Appl. No.: 17/532,374

(22) Filed: Nov. 22, 2021

(65) Prior Publication Data

US 2022/0079404 A1    Mar. 17, 2022

Related U.S. Application Data

(63) Continuation of application No. 16/774,658, filed on Jan. 28, 2020, now Pat. No. 11,241,132, which is a
(Continued)

(51) Int. Cl.
| | | |
|---|---|---|
| A47L 9/24 | (2006.01) | |
| F16L 37/00 | (2006.01) | |
| H01F 7/02 | (2006.01) | |
| H01R 13/62 | (2006.01) | |
| H01R 13/627 | (2006.01) | |
| H01R 43/26 | (2006.01) | |
| A47L 5/36 | (2006.01) | |
| A47L 9/12 | (2006.01) | |
| A47L 5/38 | (2006.01) | |

(52) U.S. Cl.
CPC ............ *A47L 9/242* (2013.01); *F16L 37/004* (2013.01); *H01F 7/02* (2013.01); *H01R 13/6205* (2013.01); *H01R 13/6271* (2013.01); *H01R 43/26* (2013.01); *A47L 5/362* (2013.01); *A47L 5/38* (2013.01); *A47L 9/127* (2013.01)

(58) Field of Classification Search
CPC .......... A47L 9/242; A47L 5/38; F16L 37/004; H01F 7/02; H01R 13/6205; H01R 13/6271; H01R 43/26; D01H 11/005; B23Q 11/0046; B08B 15/002
USPC ........................................ 15/301, 327.1, 414
See application file for complete search history.

(56) References Cited

U.S. PATENT DOCUMENTS

| | | |
|---|---|---|
| 7,252,112 B1 | 8/2007 | Imler et al. |
| 8,925,144 B2 * | 1/2015 | Mantell .................. A47L 9/242 15/327.1 |

(Continued)

FOREIGN PATENT DOCUMENTS

| | | |
|---|---|---|
| CN | 203468509 U | 3/2014 |
| FR | 1220944 A | 5/1960 |
| GB | 2508901 A | 6/2014 |

OTHER PUBLICATIONS

International Search Report and Written Opinion dated Dec. 16, 2019 in International Patent Application No. PCT/US2019/052974.
(Continued)

*Primary Examiner* — Katina N. Henson
(74) *Attorney, Agent, or Firm* — McDermott, Will & Emery LLP

(57) ABSTRACT

Connector assemblies including a first subassembly having a recessed portion and a pair of locator tracks and a second subassembly having a pair of locator projections, vacuum assemblies including these connector assemblies, and methods of using the same are provided herein.

10 Claims, 8 Drawing Sheets

Related U.S. Application Data continuation of application No. 16/582,589, filed on Sep. 25, 2019, now Pat. No. 11,241,131.

(60) Provisional application No. 62/736,278, filed on Sep. 25, 2018.

(56) References Cited

U.S. PATENT DOCUMENTS

| | | | |
|---|---|---|---|
| 9,155,438 B2 * | 10/2015 | Park | A47L 9/246 |
| 2008/0216262 A1 * | 9/2008 | Kennedy | A47L 13/42 |
| | | | 15/144.2 |
| 2009/0265872 A1 * | 10/2009 | Eldessouky | A47L 13/254 |
| | | | 15/144.1 |
| 2011/0100485 A1 | 5/2011 | Mantyla et al. | |

OTHER PUBLICATIONS

Office Action dated Jul. 10, 2020 in U.S. Appl. No. 16/582,589.
Office Action dated Jan. 25, 2021 in U.S. Appl. No. 16/582,589.
Notice of Allowance dated Aug. 2, 2021 in U.S. Appl. No. 16/582,589.
Office Action dated Apr. 2, 2020 in U.S. Appl. No. 16/774,658.
Office Action dated Jul. 6, 2020 in U.S. Appl. No. 16/774,658.
Office Action dated Jan. 25, 2021 in U.S. Appl. No. 16/774,658.
Notice of Allowance dated Aug. 13, 2021 in U.S. Appl. No. 16/774,658.

* cited by examiner

CONNECTOR ASSEMBLIES AND ASSOCIATED METHODS

CROSS-REFERENCE TO RELATED APPLICATIONS

The present application is a continuation of, and claims priority to, U.S. patent application Ser. No. 16/774,658 entitled "CONNECTOR ASSEMBLIES AND ASSOCIATED METHODS" and filed on Jan. 28, 2020, which is a continuation of, and claims priority to, U.S. patent application Ser. No. 16/582,589 entitled "CONNECTOR ASSEMBLIES AND ASSOCIATED METHODS" and filed on Sep. 25, 2019, which claims the benefit of priority under 35 U.S.C. § 119 from U.S. Provisional Patent Application Ser. No. 62/736,278 entitled "CONNECTOR ASSEMBLIES AND ASSOCIATED METHODS," filed on Sep. 25, 2018, the disclosures of all of which are hereby incorporated by reference in their entirety for all purposes.

FIELD OF THE DISCLOSURE

This disclosure generally relates to a connector assembly and methods of using the same.

BACKGROUND

Connector assemblies, particularly those used to attach vacuum hoses to vacuum housings, or vacuum attachments to vacuum hoses, often use several latch or other attachment assemblies. However, these connector assemblies are often either capable of securely connecting several parts but difficult to attach and release, or easy to attach and release but prone to detach unintentionally. Accordingly, there is a need for improved connector assemblies.

SUMMARY

According to certain aspects of the present disclosure, a connector assembly is provided. The connector assembly includes a first subassembly. The first subassembly includes a connector plate including a recessed portion. The first subassembly includes a first magnetic element disposed in the recessed portion. The first subassembly includes a pair of locator tracks disposed in the recessed portion. Each locator track of the pair of locator tracks includes a first end adjacent an outer surface of the connector plate and a second end opposite the first end. The connector assembly includes a second subassembly. The second subassembly includes a tubular body including an inner surface and an outer surface. Two locator projections extend from the outer surface of a proximal end of the tubular body. The two locator projections are selectively slidable along the locator tracks between the first end and the second end of the locator tracks. When the two locator projections are positioned at the second end of the locator tracks, the tubular body is rotatable, about an axis extending between the two locator projections, from a first position to a second position. A second magnetic element is disposed at the proximal end of the tubular body. The second magnetic element is configured to magnetically couple to the first magnetic element when the tubular body is in the second position. When the tubular body is in the second position and an axial load is applied to the tubular body in a direction extending from the proximal end toward a distal end of the tubular body, the locator projections are positioned at the second end of the locators tracks such that a load vector associated with the axial load does not extend through the axis of rotation of the tubular body, such that the axial load does not cause the tubular body to move from the second position to the first position.

According to certain aspects of the present disclosure a method for connecting a connector assembly is provided. The method includes providing a connector assembly. The connector assembly includes a first subassembly. The first subassembly includes a connector plate including a recessed portion. A first magnetic element disposed in the recessed portion. A pair of locator tracks is disposed in the recessed portion. Each locator track of the pair of locator tracks includes a first end adjacent an outer surface of the connector plate and a second end opposite the first end. The connector assembly includes a second subassembly. The second subassembly includes a tubular body including an inner surface and an outer surface. Two locator projections extend from the outer surface of a proximal end of the tubular body. The two locator projections are selectively slidable along the locator tracks between the first end and the second end of the locator tracks. When the two locator projections are positioned at the second end of the locator tracks, the tubular body is rotatable, about an axis extending between the two locator projections, from a first position to a second position. A second magnetic element is disposed at the proximal end of the tubular body. The second magnetic element is configured to magnetically couple to the first magnetic element when the tubular body is in the second position. When the tubular body is in the second position and an axial load is applied to the tubular body in a direction extending from the proximal end toward a distal end of the tubular body, the locator projections are positioned at the second end of the locators tracks such that a load vector associated with the axial load does not extend through the axis of rotation of the tubular body, such that the axial load does not cause the tubular body to move from the second position to the first position. The method includes positioning the two locator projections at the first end of the two locator tracks. The method includes rotating the tubular body about the axis from the first position to the second position to slide the two locator projections along the two locator tracks from the first ends to the second ends for releasably connecting the first subassembly and the second subassembly.

According to certain aspects of the present disclosure a vacuum assembly is provided. The vacuum assembly includes a vacuum housing including an inlet and an outlet. The vacuum assembly includes a first subassembly substantially surrounding the inlet. The first assembly includes a connector plate including a recessed portion. A first magnetic element is disposed in the recessed portion. A pair of locator tracks is disposed in the recessed portion. Each locator track of the pair of locator tracks includes a first end adjacent an outer surface of the connector plate and a second end opposite the first end. The vacuum assembly includes a second subassembly. The second subassembly includes a tubular body including an inner surface and an outer surface. Two locator projections extend from the outer surface of a proximal end of the tubular body. The two locator projections are selectively slidable along the locator tracks between the first end and the second end of the locator tracks. When the two locator projections are positioned at the second end of the locator tracks, the tubular body is rotatable, about an axis extending between the two locator projections, from a first position to a second position. A second magnetic element is disposed at the proximal end of the tubular body. The second magnetic element is configured to magnetically couple to the first magnetic element when the tubular body is in the second position. When the tubular body is in the second position and an axial load is applied to the tubular body in a direction extending from the proximal end toward a distal end of the tubular body, the locator projections are positioned at the second end of the locators tracks such that a load vector associated with the axial load does not extend through the axis of rotation of the tubular body, such that the axial load does not cause the tubular body to move from the second position to the first position.

According to certain aspects of the present disclosure a subassembly for connecting a hose to a vacuum assembly is provided. The subassembly includes a tubular body having an inner surface and an outer surface. Two locator projections extend from the outer surface of a proximal end of the tubular body. The two locator projections are configured to be selectively slidable along locator tracks of the vacuum assembly between a first end and a second end of the locator tracks. When the two locator projections are positioned at the second end of the locator tracks, the tubular body is rotatable, about an axis extending between the two locator projections, from a first position to a second position. A first magnetic element is disposed at the proximal end of the tubular body. The first magnetic element is configured to magnetically couple to a second magnetic element of the vacuum assembly when the tubular body is in the second position. When the tubular body is in the second position and an axial load is applied to the tubular body in a direction extending from the proximal end toward a distal end of the tubular body, the two locator projections are positioned at the second end of the locators tracks such that a load vector associated with the axial load does not extend through the axis of rotation of the tubular body, such that the axial load does not cause the tubular body to move from the second position to the first position.

According to certain aspects of the present disclosure a subassembly for connecting a hose to a vacuum assembly is provided. The subassembly includes a tubular body. At least one locator projection extends from the tubular body. The at least one locator projection is configured to be selectively slidable along at least one locator track of the vacuum assembly between a first end and a second end of the at least one locator track. When the at least one projection is positioned at the second end of the at least one locator track, the tubular body is rotatable, about an axis extending through the at least one locator projection and perpendicular to a vertical axis of the vacuum assembly, from a first position to a second position. A first retention means is disposed at the proximal end of the tubular body. The first retention means is configured to releasably couple with a second retention means of the vacuum assembly when the tubular body is in the second position. When the tubular body is in the second position and an axial load is applied to the tubular body in a direction extending from the proximal end toward a distal end of the tubular body, the at least one locator projection is positioned at the second end of the at least one locator track such that a load vector associated with the axial load does not extend through the axis of rotation of the tubular body, such that the axial load does not cause the tubular body to move from the second position to the first position.

According to certain implementations of the present disclosure the subassembly further includes a first electrical element disposed on the outer surface of the tubular body at the proximal end of the tubular body. The first electrical element is configured to electrically couple with a second electrical element of the vacuum assembly when the tubular body is in the second position.

According to certain implementations of the present disclosure the first retention means is a first magnetic element and the second retention means is a second magnetic element.

According to certain implementations of the present disclosure the first retention means is a latch detent and the second retention means is a latch socket.

According to certain implementations of the present disclosure the first retention means comprises a first magnetic element and a latch detent, and the second retention means comprises a second magnetic element and a latch socket.

According to certain implementations of the present disclosure the at least one locator projection is spherical.

According to certain implementations of the present disclosure the at least one locator projection includes an arcuate contour including a concave surface and an oppositely facing convex surface.

According to certain implementations of the present disclosure the at least one locator projection includes a first locator projection and a second locator projection.

According to certain aspects of the present disclosure a method configuring a vacuum assembly for a hose connection is provided. The method includes providing a first subassembly including a tubular body. At least one locator projection extends from the tubular body. The at least one locator projection is configured to be selectively slidable along at least one locator track of a second subassembly disposed on the vacuum assembly between a first end and a second end of the at least one locator track. A first retention means is disposed at the proximal end of the tubular body. The first retention means is configured to releasably couple with a second retention means of the second subassembly of the vacuum assembly. The method includes providing a second subassembly including a connector plate including a recessed portion. The second retention means is disposed in the recessed portion. The at least one locator track is disposed in the recessed portion. The first end of the at least one locator track is adjacent an outer surface of the connector plate and the second end of the at least one locator track is opposite the first end. The method includes positioning the at least one projection, in a first position, at the first end of the at least one locator track. The method includes rotating the tubular body, from the first position to a second position, about an axis extending through the at least one locator projection and perpendicular to a vertical axis of the vacuum assembly, such that the at least one projection is positioned at the second end of the at least one locator track, wherein, when the tubular body is in the second position and an axial load is applied to the tubular body in a direction extending from the proximal end toward a distal end of the tubular body, the at least one locator projection is positioned at the second end of the at least one locator track such that a load vector associated with the axial load does not extend through the axis of rotation of the tubular body, such that the axial load does not cause the tubular body to move from the second position to the first position.

DETAILED DESCRIPTION

Figure 1:
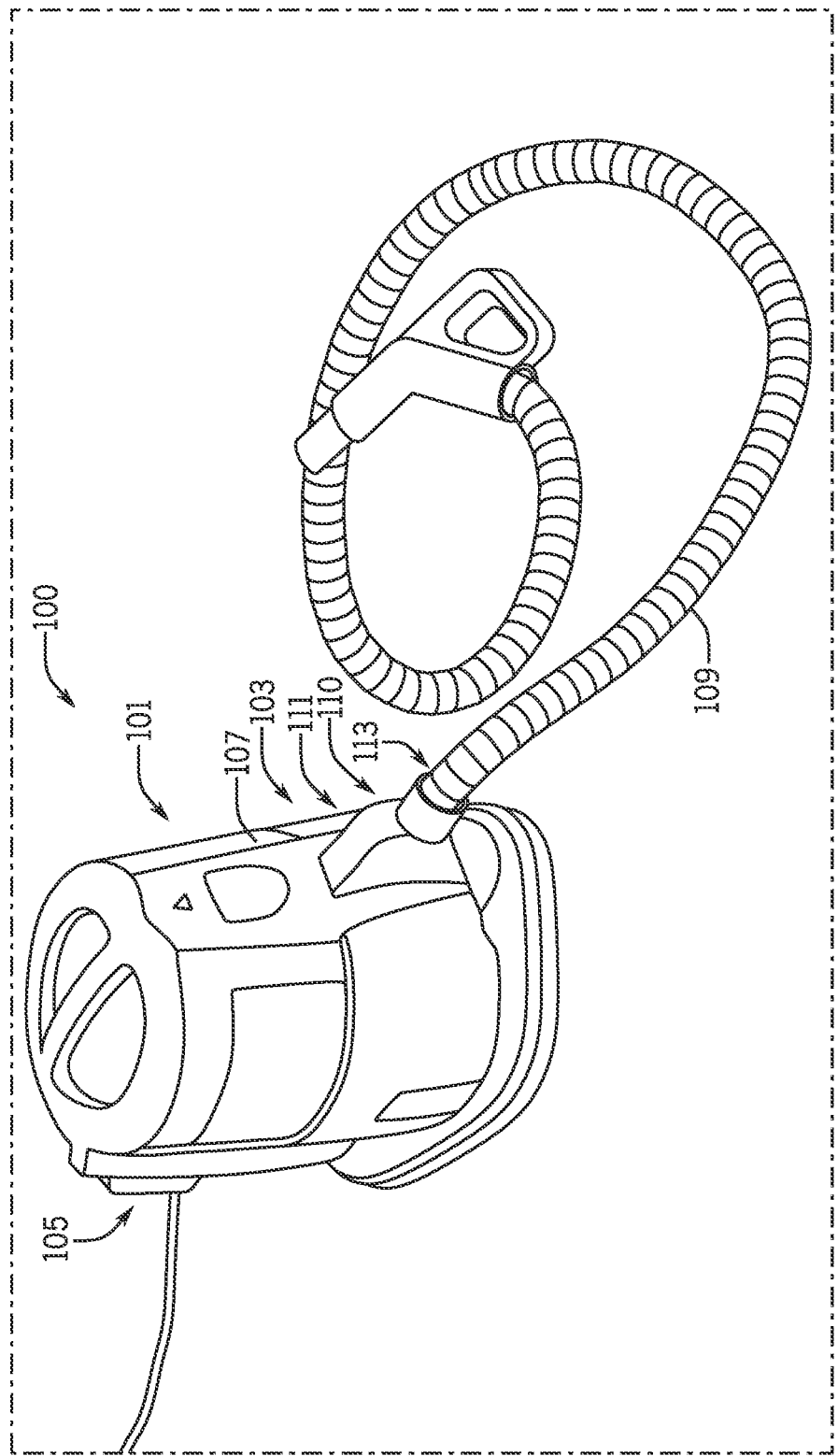
FIG. 1 is a perspective view of a vacuum including an embodiment of a connector assembly.

Connector assemblies including a first subassembly and a second subassembly, vacuums including these connector assemblies, and methods of using the same are provided herein.

In some embodiments, connector assemblies are provided including a first subassembly and a second subassembly. In some embodiments, the first subassembly includes a connector plate having a recessed portion, the recessed portion having a first magnetic element and a pair of locator tracks extending from a first end adjacent an outer surface of the connector plate to a second end opposite the first end. In some embodiments, the second subassembly includes a tubular body having an inner surface and an outer surface and two locator projections extending from the outer surface of a proximal end of the tubular body and selectively slidable along the locator tracks between the first end and the second end of the locator tracks, wherein, when the two locator projections are positioned at the second end of the locator tracks, the tubular body is rotatable about an axis extending between the two locator projections, from a first position to a second position; and a second magnetic element associated with the outer surface of the tubular body at the proximal end of the tubular body, opposite the two locator projections, and configured to magnetically couple to the first magnetic element when the tubular body is in the second position, wherein, when the tubular body is in the second position and an axial load is applied to the tubular body in a direction extending from the proximal end toward a distal end of the tubular body, the locator projections are positioned at the second end of the locator tracks such that a load vector associated with the axial load does not extend through the axis of rotation of the tubular body, such that the axial load does not cause the tubular body to move from the second position to the first position.

The locator tracks and corresponding locator projections advantageously allow a user to easily align the first subassembly and the second subassembly to couple the first and second magnetic elements together. For example, the two locator tracks and locator projections allow a user to connect the first and second subassemblies without having to rotate the tubular body of the second subassembly in an attempt to manually align the magnetic and electrical elements.

Further, in embodiments in which the locator projections are positioned such that a load vector associated with the axial load does not extend through the axis of rotation of the tubular body, the first subassembly and second subassembly can be more securely connected. Specifically, a user can apply an axial load to the tubular body, such as a user might apply when pulling on a vacuum hose attached to the tubular body, without causing the first subassembly to inadvertently detach from the second subassembly.

In some embodiments, each of the locator tracks has a width at its first end which is wider than the width at its second end. For example, in some embodiments, each of the locator tracks has a width at its first end which is twice the width at its second end. In these embodiments, a user need only align the locator projections with a part of the wider first end of the locator tracks, and the locator tracks guide the second subassembly into place, as the locator projections will follow the locator tracks as they narrow. In some embodiments, the recessed portion of the first subassembly further includes a first electrical element and the second subassembly further includes a second electrical element associated with the outer surface of the tubular body at or near the proximal end of the tubular body, opposite the two locator projections, and configured to electrically couple to the first electrical element when the tubular body is in the second position. For example, in some embodiments, the second electrical element may be coupled to a surface adjacent to the tubular body, or to a separate component coupled to the tubular body.

In some embodiments, the first magnetic element and the second magnetic element also guide the second subassembly into the appropriate position, to couple the first magnetic element and the second magnetic element and to couple the first electrical element and the second electrical element. For example, in some embodiments, when the tubular body is being rotated from the first position toward the second position, the strength of the first magnetic element and the second magnetic element pull the proximal end of the tubular body toward the first subassembly, leading the first subassembly and the second subassembly to "snap" into place. In these embodiments, the magnetic coupling of the first and second magnetic elements provides a user with tactile and audible feedback, confirming to a user that the first subassembly and the second subassembly have been connected to one another.

In some embodiments, when the second subassembly is in the second position, the first electrical element and the second electrical element are coupled together and configured to provide power to a motorized attachment. In some embodiments, the motorized attachment is a vacuum cleaner which is operatively connected to the first subassembly. In some embodiments, the motorized attachment is a motorized vacuum attachment which is operatively connected to the proximal end of the tubular body. For example, in some embodiments, the motorized vacuum attachment is an upholstery cleaning tool. In some embodiments, a vacuum attachment is operatively connected to the proximal end of the tubular body. In some embodiments, the vacuum attachment is a Rainbow® Power Nozzle attachment, a Rainbow® AquaMate® attachment, a Rainbow® RainJet® attachment, a Rainbow® RainbowMate® attachment, a Rainbow® MiniJet® attachment, a Rainbow® JetPad™ attachment, a floor or wall brush, a dusting brush, an upholstery tool, a crevice tool, or the like.

In some embodiments, the connector assembly further includes a cover portion attached to the recessed portion, in which the cover portion is configured to be selectively movable between a closed position, in which it covers the first magnetic element and the first electrical element and an open position, wherein the first magnetic element and the first electrical element are exposed. For example, in some embodiments, the cover portion is hingedly attached to the recessed portion of the first subassembly. In some embodiments, the cover portion includes a cam surface, wherein the cover portion is configured to be movable between the closed position and the open position by rotation of the tubular body from the first position to the second position. In this way, the first electrical element and the first magnetic element are covered when not in use, but can be uncovered without any additional action by the user. That is, the cover can be moved from a closed position to an open position merely by rotating the tubular body from the first position to the second position.

In some embodiments, the second subassembly further includes a latch extending from the outer surface of the tubular body at the distal end of the tubular body opposite the locator projections. In some embodiments, the latch comprises a detent means at the proximal end of the tubular body and a release means at the distal end of the tubular body, the first assembly further comprises a latch socket disposed within the recessed portion, such that when the tubular body is rotated from the first position to the second position, the latch is secured within the latch socket, thereby releasably connecting the first subassembly and the second subassembly. In these embodiments, the second subassembly can be detached from the first subassembly when a user grasps the distal end of the tubular body and thereby grasps the release means of the latch. In particular, in these embodiments, a user can easily detach the second subassembly from the first subassembly simply by grasping the distal end of the tubular body including the release latch and rotating the tubular body from the second position to the first position. For example, in some embodiments, the latch may be coupled to a surface adjacent to the tubular body, or to a separate component coupled to the tubular body.

In some embodiments, the two locator projections are spherical. In some embodiments, the two locator tracks are partially cylindrical or conical.

In some embodiments, each of the first and second magnetic elements is a magnet. In some embodiments, one of the first and second magnetic elements comprises a ferromagnetic material and one of the first and second magnetic elements comprises a magnet. For example, in some embodiments, the magnet comprises neodymium, iron, boron, or combinations thereof. In some embodiments, the magnet is a printed magnet or a poly magnet.

In some embodiments, the first subassembly is disposed on the outer surface of a vacuum housing. For example, in some embodiments, the first subassembly is disposed on the outer surface of a canister vacuum. In some embodiments, the first subassembly is disposed on the outer surface of an upright vacuum. In some embodiments, the first subassembly is disposed on the outer surface of a vacuum cleaner as described in U.S. Pat. No. 6,361,587, entitled "Vacuum Cleaner," the disclosure of which is hereby incorporated by reference herein in its entirety. In some embodiments, the first subassembly is disposed on the outer surface of a vacuum cleaner as described in U.S. Pat. No. 2,102,353, entitled "Vacuum Cleaner," the disclosure of which is hereby incorporated by reference herein in its entirety. In some embodiments, the distal end of the tubular body is operatively connected to a vacuum hose. For example, in some embodiments, the first subassembly is disposed on the outer surface of a vacuum housing, and the distal end of the tubular body is operatively connected to a vacuum house. In some embodiments, vacuum assemblies are provided including a vacuum housing having an inlet and an outlet and any of the connector assemblies described above, wherein the first subassembly substantially surrounds the inlet.

In some embodiments, methods of connecting the connector assemblies described above are provided. In some embodiments, the methods include moving the two locator projections from the first end of the two locator tracks to the second end of the two locator tracks, and rotating the tubular body about the axis from the first position to the second position, thereby releasably connecting the first subassembly and the second subassembly.

ILLUSTRATED EMBODIMENTS

FIG. 1 shows a vacuum assembly 100, having a vacuum housing 101 with an outer surface 107, an inlet 103, an outlet 105, and a connector assembly 110. A first subassembly 111 is attached to the outer surface 107 of the vacuum assembly 100, and the second subassembly 113 is connected to the first subassembly 111. A vacuum hose 109 is attached to the second subassembly 113.

Figure 2:
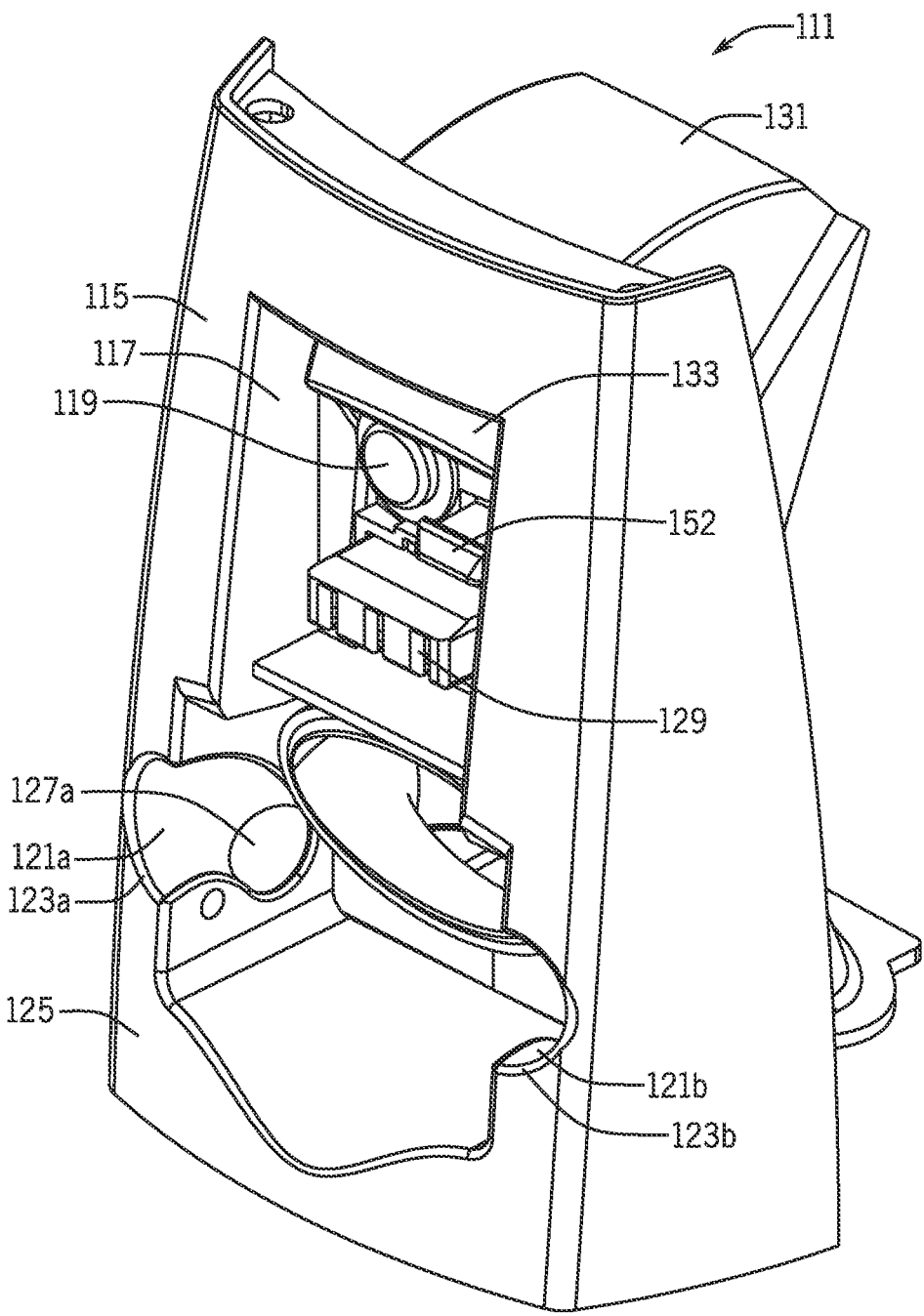
FIG. 2 is a perspective view of a first subassembly of an embodiment of a connector assembly.

FIG. 2 shows a perspective view of the first subassembly 111 including a connector plate 115 having a recessed portion 117, the recessed portion 117 having a first magnetic element 119 and a pair of locator tracks 121a, 121b extending from a first end 123a, 123b adjacent an outer surface 125 of the connector plate 115 to a second end 127a, 127b opposite the first end 123a, 123b. The first subassembly includes a cover portion 131, shown in an open position, having a first cam surface 133. The first subassembly 111 includes a first magnetic element 119 and a first electrical element 129, and a latch socket 152.

Figure 3:
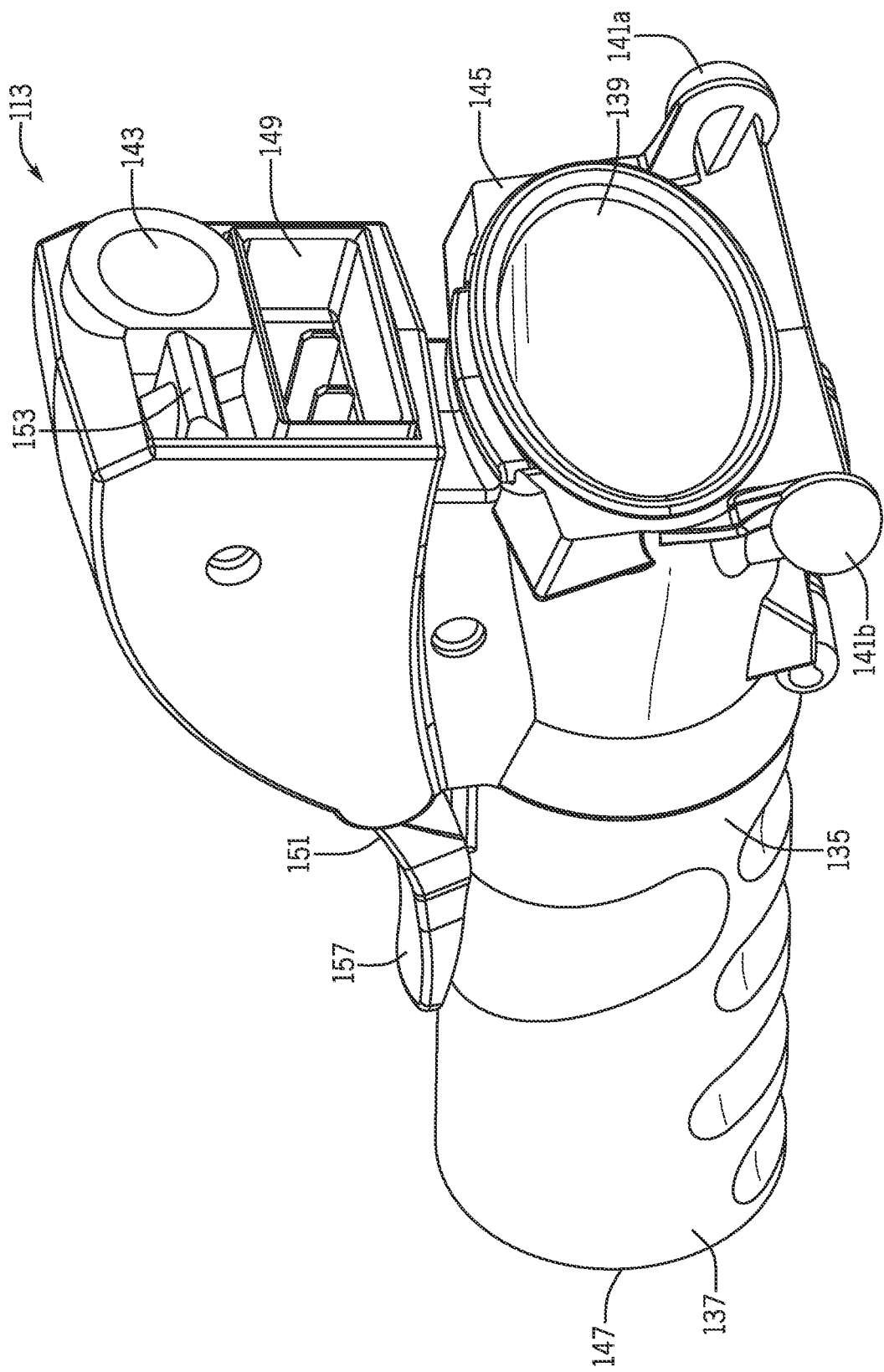
FIG. 3 is a perspective view of a second subassembly of an embodiment of a connector assembly.

FIG. 3 shows a perspective view of the second subassembly 113 including a tubular body 135 having an outer surface 137 and an inner surface 139, a proximal end 145, and a distal end 147. Two locator projections 141a, 141b extend from the outer surface 137 at the proximal end 145. The two locator projections 141a, 141b are selectively slidable along the locator tracks 121a, 121b, respectively. The second subassembly 113 further includes a second magnetic element 143 and a second electrical element 149. The second subassembly 113 further includes a latch 151 having a detent means 153 at the proximal end 145 and a release means 157 near the distal end 147.

Figure 4:
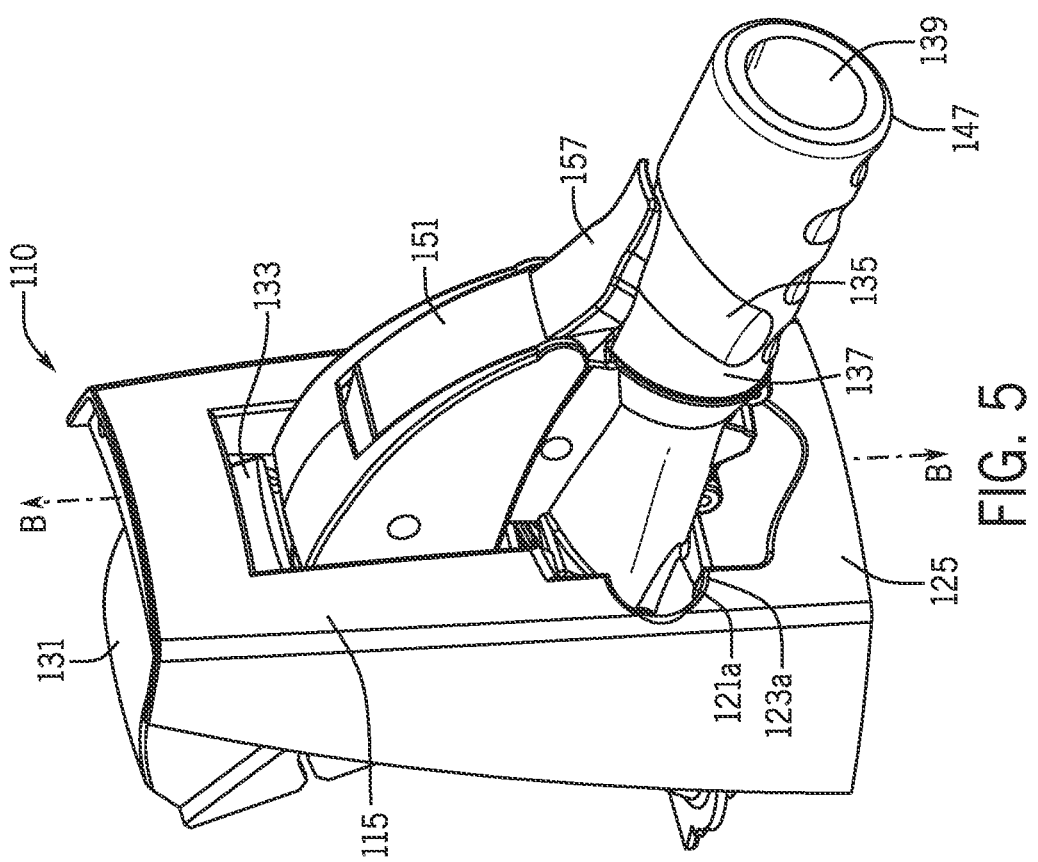
FIG. 4 is a perspective view of an embodiment of a connector assembly in a first position.
Figure 6:
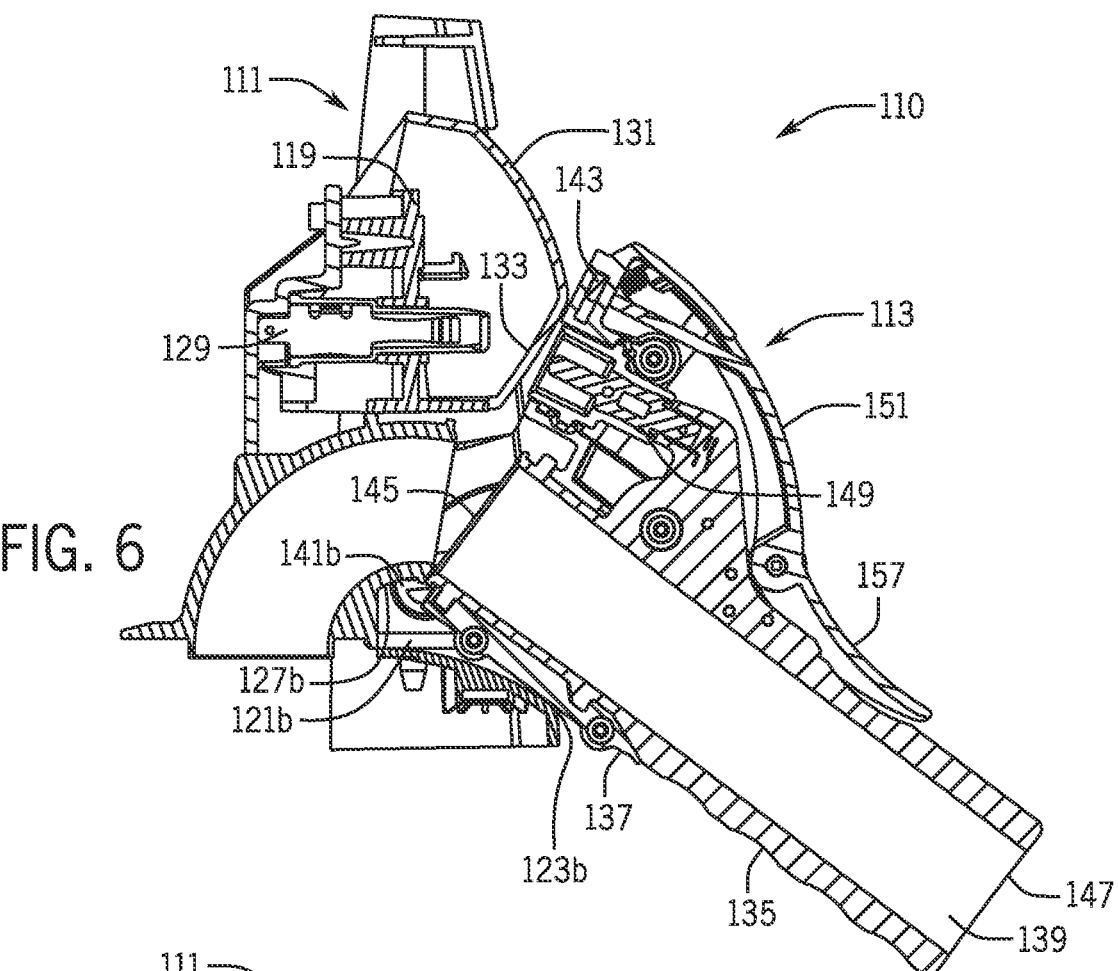
FIG. 6 is a cross-sectional view of the connector assembly of FIG. 4, taken along the line A-A.

FIGS. 4 and 6 show a perspective view and a cross-sectional view, respectively, of the connector assembly 110 with the tubular body 135 in a first position, where the two locator projections are at the second end 127a, 127b of the locator tracks 121a, 121b. In this first position, the cover portion 131 is closed, such that the first magnetic element 119 is separated from the second magnetic element 143, the first electrical element 129 is separated from the second electrical element 149, and the latch detent means 153 is separated from the latch socket 152. As can be seen from FIG. 6, in the first position, a portion of the proximal end 145 of the tubular body 135 contacts the cam surface 133.

Figure 5:
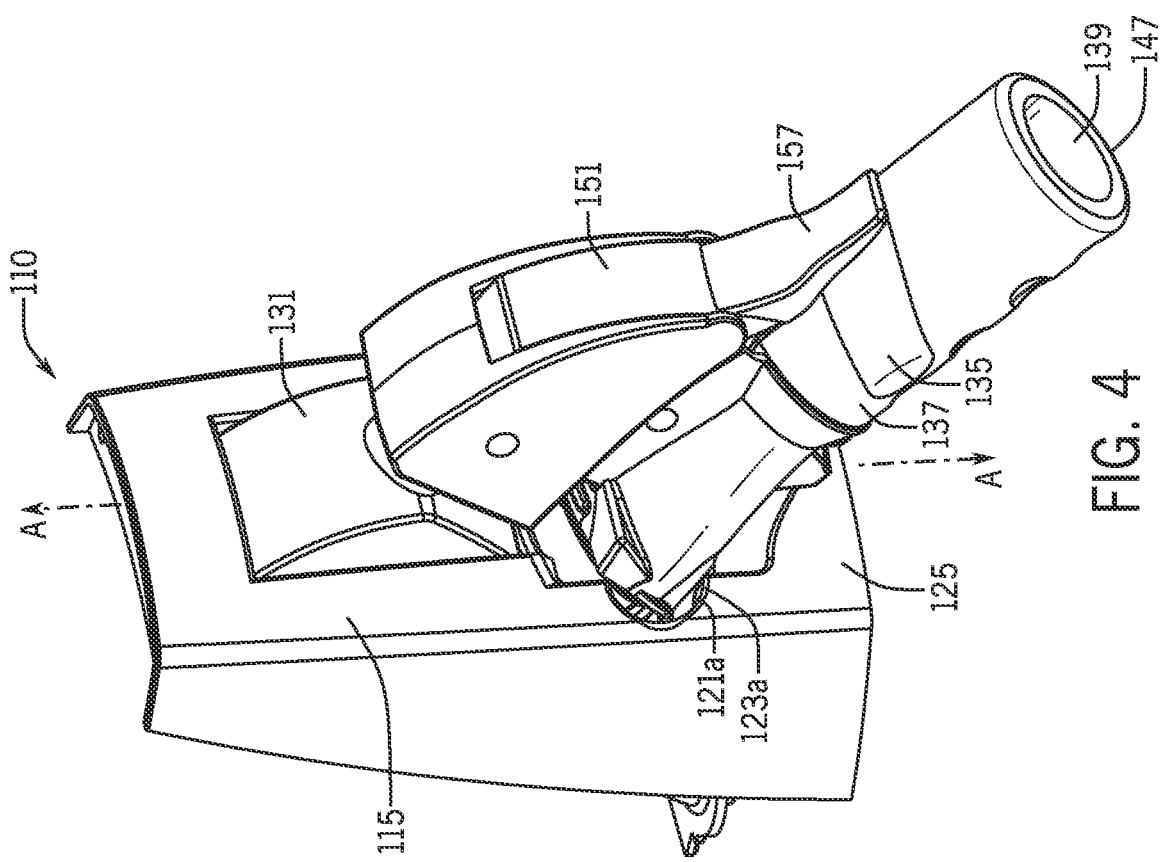
FIG. 5 is a perspective view of an embodiment of a connector assembly in a second position.
Figure 7:
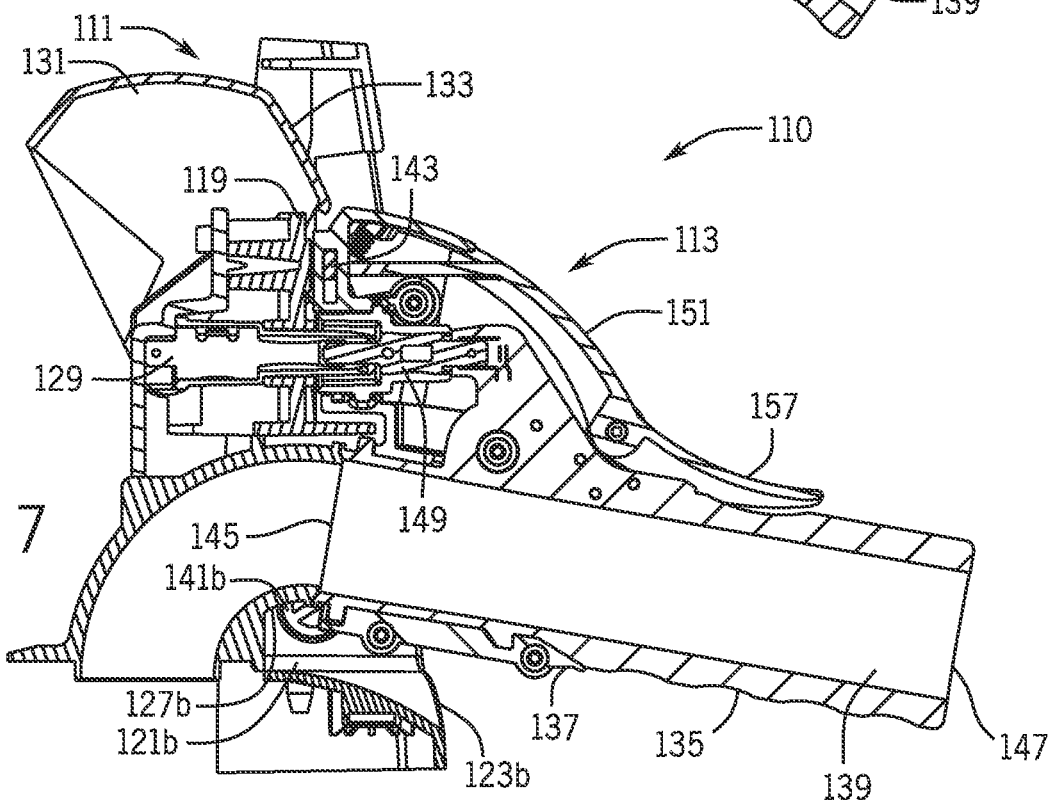
FIG. 7 is a cross-sectional view of the connector assembly of FIG. 5, taken along the line B-B.

FIGS. 5 and 7 show a perspective view and a cross-sectional view, respectively, of the connector assembly 110 with the tubular body 135 in a second position, where the two locator projections are at the second end 127a, 127b of the locator tracks 121a, 121b and the cover portion 131 is in an open position. In this second position, the first magnetic element 119 is coupled to the second magnetic element 143, the first electrical element 129 is coupled to the second electrical element 149, and the latch detent means 153 is disposed in the latch socket 152. In certain implementations, the connector assembly 110 includes only the first magnetic element 119 and the second magnetic element 143, only the latch detent means 153 and the latch socket 152, or all of the first magnetic element 119, the second magnetic element 143, the latch detent means 153, and the latch socket 152 for retaining the second subassembly 113 to the first subassembly 111.

Figure 8:
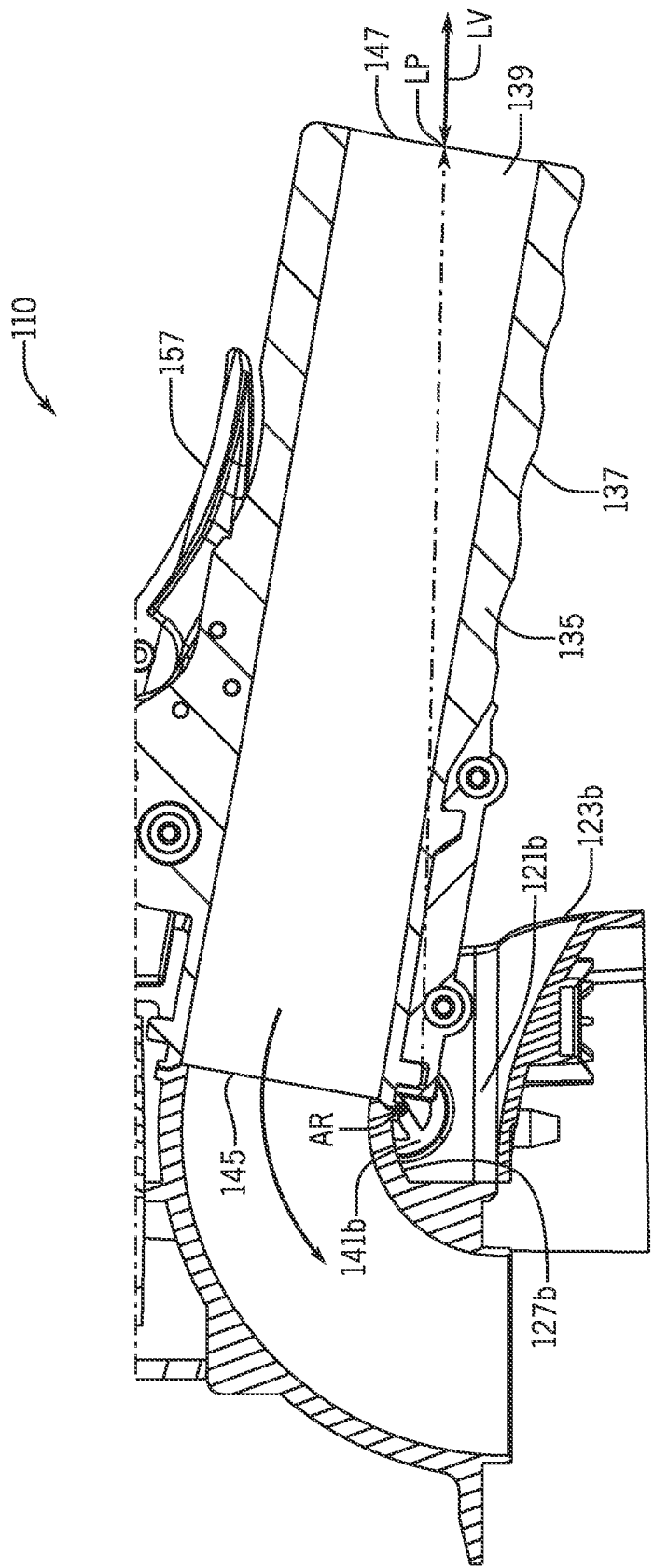
FIG. 8 is a partial view of the cross-section of FIG. 7, showing the axis of rotation and load vector.

FIG. 8 is a partial view of the connector assembly 110 of FIG. 7, showing the axis of rotation AR when the tubular body 135 is rotated from the first position to the second position, and an axial load vector LV. As can be seen from this figure, the load vector LV advantageously passes through the tubular body below the rotation axis AR. As a result, applying this load LP to the tubular body 135 merely serves to strengthen the attachment between the first subassembly 111 and the second subassembly 113, rather than to cause the tubular body 135 to move from the second position to the first position. Specifically, applying this load LP to the tubular body 135 forces the second magnetic element 143 toward the first magnetic element 119 and the second electrical element 149 toward the first electrical element 129.

Figure 9:
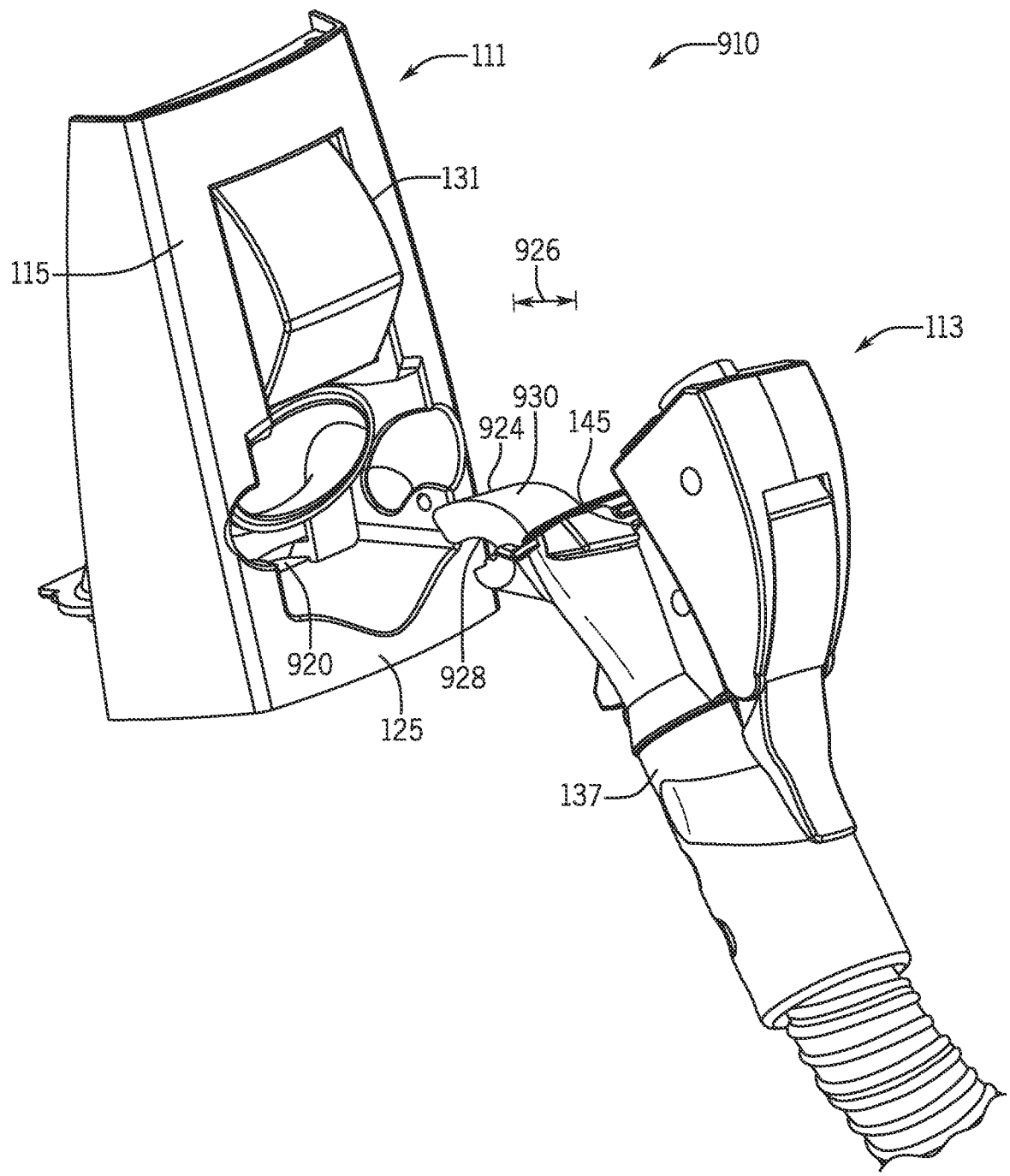
FIG. 9 is a perspective view of an alternative connector assembly in a first position.
Figure 10:
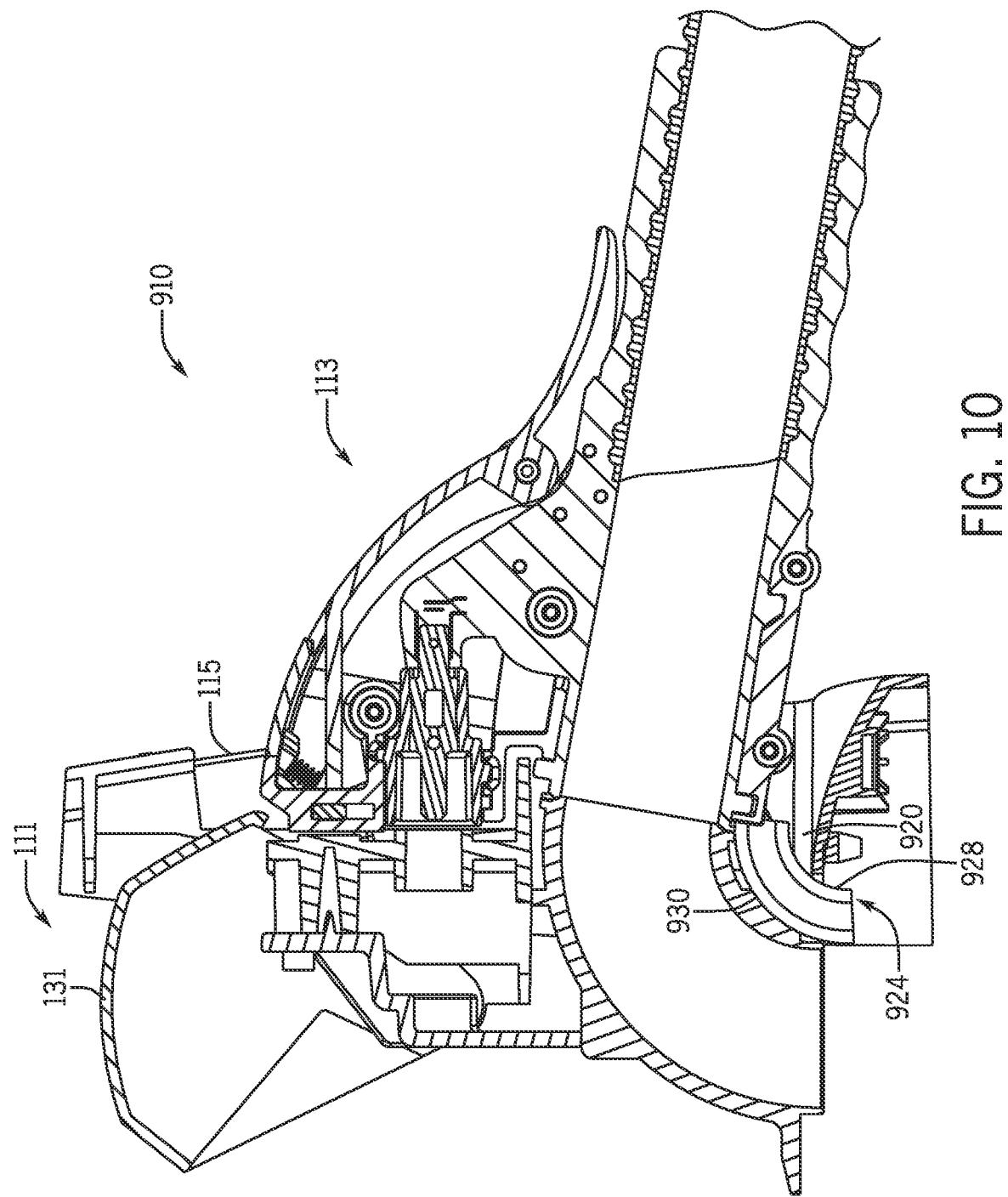
FIG. 10 is a perspective view of the connector assembly of FIG. 9 in a second position.

FIGS. 9 and 10 illustrate an alternative connector assembly 910 that is similar in structure to the connector assembly 110 such that similar parts are denoted by like reference numerals and the above descriptions are relied upon to describe them. Instead of including the pair of locator tracks 121a, 121b illustrated in FIG. 2, the first subassembly 111 includes a locator track 920 disposed in the recessed portion 117 of the first subassembly 111. The locator track 920 is offset inwardly from the outer surface 125 of the connector plate 115. In certain implementations, the locator track 920 includes a contour configured to receive a locator projection 924 of the second subassembly 113. In certain implementations, the locator track 920 is centrally aligned with respect to the cover portion 131.

The second subassembly 113 includes the locator projection 924 instead of the two locator projections 141a, 141b illustrated in FIG. 3. The locator projection 924 extends from the outer surface 137 at the proximal end 145 of the second subassembly 113. In certain implementations, the locator projection 924 is centrally aligned with respect to a width 926 of the proximal end 145. In certain implementations, the locator projection 924 includes an arcuate contour including a concave surface 928 and an oppositely facing convex surface 930. The locator projection 924 is selectively slidable along the locator track 920. In certain implementations, the concave surface 928 selectively slidable along the locator track 920.

As depicted in FIG. 9, prior to being set in the first position, the locator projection 924 can be aligned to interface with the locator track 920. After being set in the first position, the second subassembly 113 is rotated from the first position to the second position, as illustrated in FIG. 10. In this second position, the first magnetic element 119 (not shown) is coupled to the second magnetic element 143 (not shown) such that the locator projection 924 is positioned in contact with the locator track 920 and the latch detent means 153 (not shown) of the second subassembly 113 is secured in the latch socket 152 (not shown) of the first subassembly 111.

In certain implementations, instead of including an arcuate contour as illustrated in FIG. 9, the locator projection 924 can include a spherical contour similar to the locator projection 141b illustrated in FIG. 3 while the locator track 920 can include a partially cylindrical or conical contour for receiving the spherical contour of the locator projection 924.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A connector assembly comprising:
   a first subassembly comprising:
      a connector plate having a recessed portion; and
      a pair of locator tracks disposed in the recessed portion, each locator track of the pair of locator tracks comprising a first end adjacent an outer surface of the connector plate and a second end opposite the first end; and
   a second subassembly comprising:
      a tubular body having an inner surface and an outer surface; and
      two locator projections extending from the outer surface of a proximal end of the tubular body, the two locator projections selectively slidable along the locator tracks between the first end and the second end of the locator tracks, wherein, when the two locator projections are positioned at the second end of the locator tracks, the tubular body is rotatable, about an axis of rotation located near a peripheral edge of the proximal end of the tubular body and extending between and passing through each of the two locator projections such that the proximal end of the tubular body pivots about the axis of rotation from a first position to a second position,
      wherein, when the tubular body is in the second position and an axial load is applied to the tubular body in a direction extending from the proximal end toward a distal end of the tubular body, the locator projections are positioned at the second end of the locators tracks such that a load vector associated with the axial load does not extend through the axis of rotation of the tubular body, such that the axial load does not cause the tubular body to move from the second position to the first position.

2. The connector assembly of claim 1, wherein each of the locator tracks has a width at its first end which is wider than a width at its second end.

3. The connector assembly of claim 1, wherein:
   the recessed portion of the first subassembly further comprises a first electrical element, and
   the second subassembly further comprises a second electrical element disposed at the proximal end of the tubular body, the second electrical element configured to electrically couple to the first electrical element when the tubular body is in the second position.

4. The connector assembly of claim 3, wherein the first subassembly further comprises:
   a cover portion attached to the recessed portion,
   wherein the cover portion is configured to be selectively movable between a closed position, wherein it covers the first electrical element, and an open position, wherein the first electrical element is exposed.

5. The connector assembly of claim 4, wherein the cover portion further comprises a cam surface, and wherein the cover portion is configured to be moveable between the closed position and the open position by rotation of the tubular body from the first position to the second position.

6. The connector assembly of claim 1, wherein the second subassembly further comprises a latch extending from the outer surface of the tubular body at the distal end of the tubular body opposite the two locator projections,
- wherein the latch comprises a detent means at the proximal end of the tubular body and a release means at the distal end of the tubular body,
- wherein the first assembly further comprises a latch socket disposed within the recessed portion, and
- wherein, when the tubular body is rotated from the first position to the second position, the latch is secured within the latch socket, thereby releasably connecting the first subassembly and the second subassembly.

7. The connector assembly of claim 1, wherein each of the two locator projections is spherical.

8. The connector assembly of claim 1, wherein the first subassembly is disposed on the outer surface of a vacuum housing, and the distal end of the tubular body is operatively connected to a vacuum hose.

9. A vacuum assembly comprising:
- a vacuum housing having an inlet and an outlet;
- a first subassembly substantially surrounding the inlet, the first subassembly comprising:
  - a connector plate having a recessed portion; and
  - a pair of locator tracks disposed in the recessed portion, each locator track of the pair of locator tracks comprising a first end adjacent an outer surface of the connector plate and a second end opposite the first end; and
- a second subassembly comprising:
  - a tubular body having an inner surface and an outer surface; and
  - two locator projections extending from the outer surface of a proximal end of the tubular body, and the two locator projections selectively slidable along the locator tracks between the first end and the second end of the locator tracks, wherein, when the two locator projections are positioned at the second end of the locator tracks, the tubular body is rotatable, about an axis of rotation located near a peripheral edge of the proximal end of the tubular body and extending between and passing through each of the two locator projections such that the proximal end of the tubular body pivots about the axis of rotation from a first position to a second position,
- wherein, when the tubular body is in the second position and an axial load is applied to the tubular body in a direction extending from the proximal end toward a distal end of the tubular body, the locator projections are positioned at the second end of the locators tracks such that a load vector associated with the axial load does not extend through the axis of rotation of the tubular body, such that the axial load does not cause the tubular body to move from the second position to the first position.

10. A subassembly for connecting a hose to a vacuum assembly, the subassembly comprising:
- a tubular body having an inner surface and an outer surface;
- two locator projections extending from the outer surface of a proximal end of the tubular body, the two locator projections configured to be selectively slidable along locator tracks of the vacuum assembly between a first end and a second end of the locator tracks, wherein, when the two locator projections are positioned at the second end of the locator tracks, the tubular body is rotatable, about an axis of rotation located near a peripheral edge of the proximal end of the tubular body and extending between and passing through each of the two locator projections such that the proximal end of the tubular body pivots about the axis of rotation from a first position to a second position, wherein, when the tubular body is in the second position and an axial load is applied to the tubular body in a direction extending from the proximal end toward a distal end of the tubular body, the two locator projections are positioned at the second end of the locators tracks such that a load vector associated with the axial load does not extend through the axis of rotation of the tubular body, such that the axial load does not cause the tubular body to move from the second position to the first position.

* * * * *